United States Patent
Prasky et al.

(10) Patent No.: US 10,261,791 B2
(45) Date of Patent: Apr. 16, 2019

(54) BYPASSING MEMORY ACCESS FOR A LOAD INSTRUCTION USING INSTRUCTION ADDRESS MAPPING

(71) Applicant: International Business Machines Corporation, Armonk, NY (US)

(72) Inventors: Brian R. Prasky, Campbell Hall, NY (US); David A. Schroter, Round Rock, TX (US); Chung-Lung K. Shum, Wappingers Falls, NY (US); Corey C. Stappenbeck, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 94 days.

(21) Appl. No.: 15/441,604

(22) Filed: Feb. 24, 2017

(65) Prior Publication Data

US 2018/0246723 A1    Aug. 30, 2018

(51) Int. Cl.
  *G06F 9/30*   (2018.01)
  *G06F 9/32*   (2018.01)
  *G06F 9/38*   (2018.01)

(52) U.S. Cl.
  CPC ...... *G06F 9/30043* (2013.01); *G06F 9/30021* (2013.01); *G06F 9/30058* (2013.01);
  (Continued)

(58) Field of Classification Search
  None
  See application file for complete search history.

(56) References Cited

U.S. PATENT DOCUMENTS

| 6,065,103 | A  | * | 5/2000 | Tran  | G06F 9/3834 |
|---|---|---|---|---|---|
|  |  |  |  |  | 711/117 |
| 6,349,382 | B1 | * | 2/2002 | Feiste | G06F 9/3824 |
|  |  |  |  |  | 712/216 |

(Continued)

FOREIGN PATENT DOCUMENTS

CN    102184127 A    9/2011

OTHER PUBLICATIONS

Jourdan, S., et al., "A Novel Renaming Scheme to Exploit Value Temporal Locality Through Physical Register Reuse and Unification," ad4d82eccb13dcced3df0eb6f11f9fbf3e17.pdf, 10 pages.

(Continued)

*Primary Examiner* — Corey S Faherty
(74) *Attorney, Agent, or Firm* — Cantor Colburn LLP; William Kinnaman

(57) ABSTRACT

Systems, methods, and computer-readable media are disclosed for executing a predicted load that bypasses memory access for a load instruction. A first physical register that is predicted as storing a value to be loaded by the load instruction is identified and the value stored in the first physical register is copied to a second physical register for use by a consumer operation. A predicted store instruction corresponding to the load instruction is identified and a mapping table is accessed to obtain data associated with the predicted store instruction. The data is evaluated to determine whether the predicted load meets dependency constraints. As a result of execution of the predicted load, the consumer operation can utilize the data stored in the first physical register directly and bypass the cache memory access that would otherwise be required to execute the load instruction.

20 Claims, 4 Drawing Sheets

(52) U.S. Cl.
CPC ............ *G06F 9/30098* (2013.01); *G06F 9/32* (2013.01); *G06F 9/384* (2013.01)

(56) References Cited

U.S. PATENT DOCUMENTS

| | | | |
|---|---|---|---|
| 6,625,723 | B1 | 9/2003 | Jourday et al. |
| 6,675,287 | B1 * | 1/2004 | Gaskins ................ G06F 9/3834 |
| | | | 712/216 |
| 7,640,419 | B2 | 12/2009 | Hily et al. |
| 7,984,274 | B2 * | 7/2011 | Kadambi ............ G06F 9/30043 |
| | | | 712/220 |
| 9,311,095 | B2 | 4/2016 | Gschwind et al. |
| 9,575,897 | B2 * | 2/2017 | Mizrahi .............. G06F 12/0875 |
| 2005/0149702 | A1 | 7/2005 | Hily et al. |
| 2013/0246712 | A1 | 9/2013 | Liu et al. |
| 2014/0047216 | A1 | 2/2014 | Gschwind et al. |
| 2015/0293853 | A1 | 10/2015 | Yu et al. |
| 2015/0309792 | A1 | 10/2015 | Meier et al. |

OTHER PUBLICATIONS

Moshovos, A., et al., "Streamlining Inter-operation Memory Communication via Data Dependence Prediction," IEEE, Published in the Proceedings of Micro-30, Dec. 1-3, 1997, 11 pages.
Gary S. Tyson et al, "Memory Renaming: Fast, Early and Accurate Processing of Memory Communication", International Journal of Parallel Programming , vol. 27, No. 5, 1999, pp. 357-380.
PCT/IB2018/051025 International Search Report and Written Opinion, dated Jun. 27, 2018.

\* cited by examiner

BYPASSING MEMORY ACCESS FOR A LOAD INSTRUCTION USING INSTRUCTION ADDRESS MAPPING

BACKGROUND

Executing computer program instructions may include storing data in physical registers. During program execution, data stored in a physical register may need to be stored in a memory location and data stored in a memory location may need to be loaded into a physical register. In microarchitecture designs (e.g., a central processing unit (CPU)), instruction execution units are located closer to physical registers than to memory. As such, loading data from a memory location (even a cache memory location) into a physical register typically takes a longer amount of time than copying the data from another physical register.

SUMMARY

In one or more example embodiments of the disclosure, a method for bypassing memory access for a load instruction is disclosed. The method includes determining a predicted instruction address (IA) corresponding to a load IA associated with the load instruction at least in part by accessing a first data structure that is indexed by only IAs associated with load instructions, and utilizing at least a portion of the predicted IA to i) access a second data structure to determine a first physical register storing a value associated with the load instruction or to ii) access a third data structure in lieu of accessing the second data structure in order to obtain the value associated with the load instruction. The method further includes executing a predicted load at least in part by setting a second physical register to the value associated with the load instruction.

In one or more other example embodiments of the disclosure, a system for bypassing memory access for a load instruction is disclosed. The system includes at least one memory storing computer-executable instructions and at least one processor configured to access the at least one memory and execute the computer-executable instructions to perform a set of operations. The operations include determining a predicted instruction address (IA) corresponding to a load IA associated with the load instruction at least in part by accessing a first data structure that is indexed by only IAs associated with load instructions, and utilizing at least a portion of the predicted IA to i) access a second data structure to determine a first physical register storing a value associated with the load instruction or to ii) access a third data structure in lieu of accessing the second data structure in order to obtain the value associated with the load instruction. The operations further include executing a predicted load at least in part by setting a second physical register to the value associated with the load instruction.

In one or more other example embodiments of the disclosure, a computer program product for bypassing memory access for a load instruction is disclosed that includes a non-transitory storage medium readable by a processing circuit, the storage medium storing instructions executable by the processing circuit to cause a method to be performed. The method includes determining a predicted instruction address (IA) corresponding to a load IA associated with the load instruction at least in part by accessing a first data structure that is indexed by only IAs associated with load instructions, and utilizing at least a portion of the predicted IA to i) access a second data structure to determine a first physical register storing a value associated with the load instruction or to ii) access a third data structure in lieu of accessing the second data structure in order to obtain the value associated with the load instruction. The method further includes executing a predicted load at least in part by setting a second physical register to the value associated with the load instruction.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the disclosure include, among other things, systems, methods, computer-readable media, techniques, and methodologies for executing a predicted load that bypasses memory access for a load instruction. In certain example embodiments, a first physical register that is predicted as storing a value to be loaded by the load instruction is identified and the value stored in the first physical register is copied to a second physical register for use by a consumer operation. A predicted store instruction corresponding to the load instruction may be identified and a mapping table may be accessed to obtain data associated with the predicted store instruction. The data may include an identification of the first physical register as well as an identification (e.g., an instruction identifier) of a producer operation that generated/modified the value stored in the first physical register. As a result of execution of the predicted load, the desired data is obtained from the producer operation and the cache memory access that would otherwise be required to execute the load instruction and copy the data from a memory location to a physical register can be bypassed.

Figure 1:
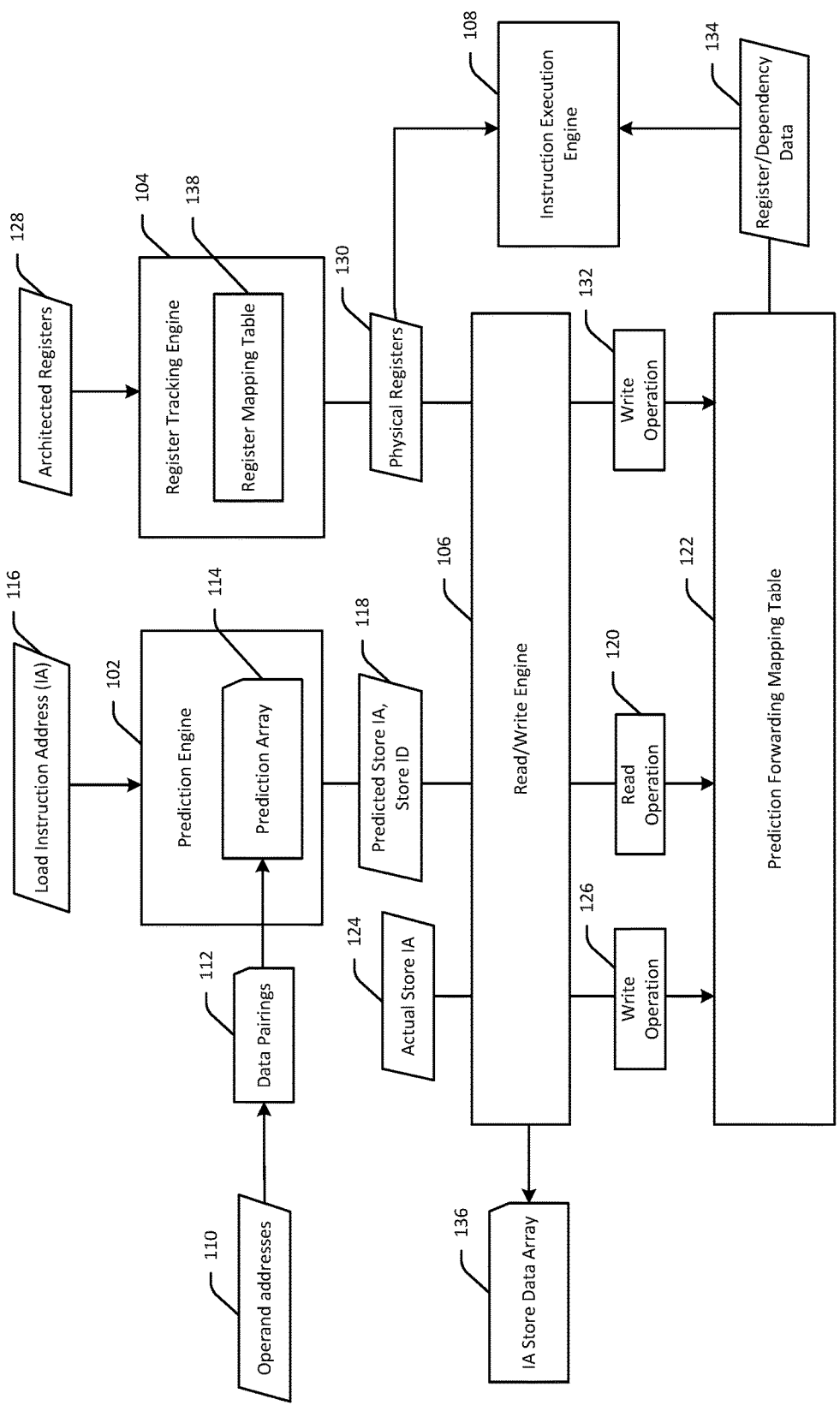
FIG. 1 is a block diagram schematically depicting execution of a predicted load to bypass memory access for a load instruction in accordance with one or more example embodiments of the disclosure.
Figure 2:
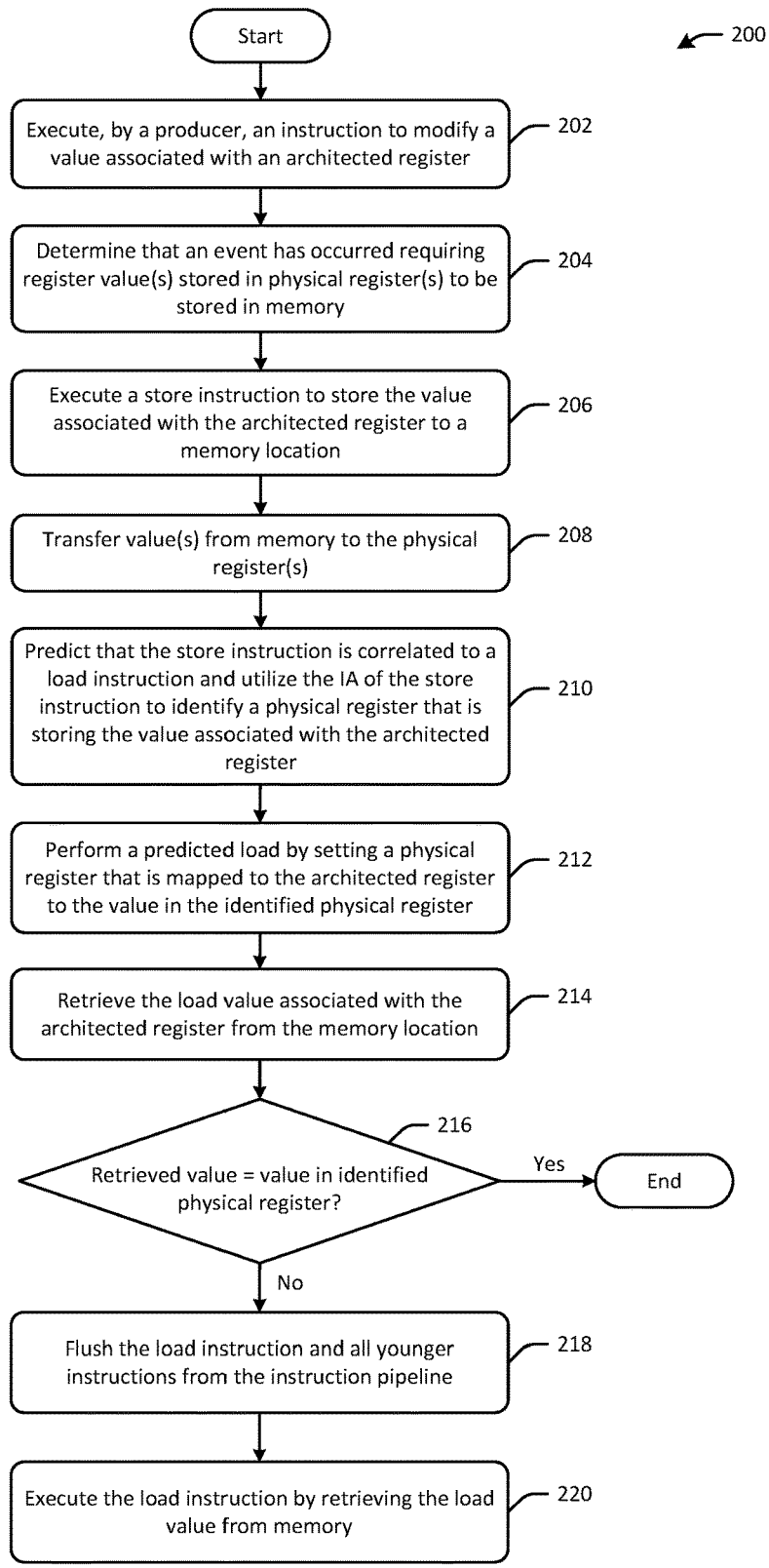
FIG. 2 is a process flow diagram of an illustrative method for executing a predicted load to bypass memory access for a load instruction in accordance with one or more example embodiments of the disclosure.
Figure 3:
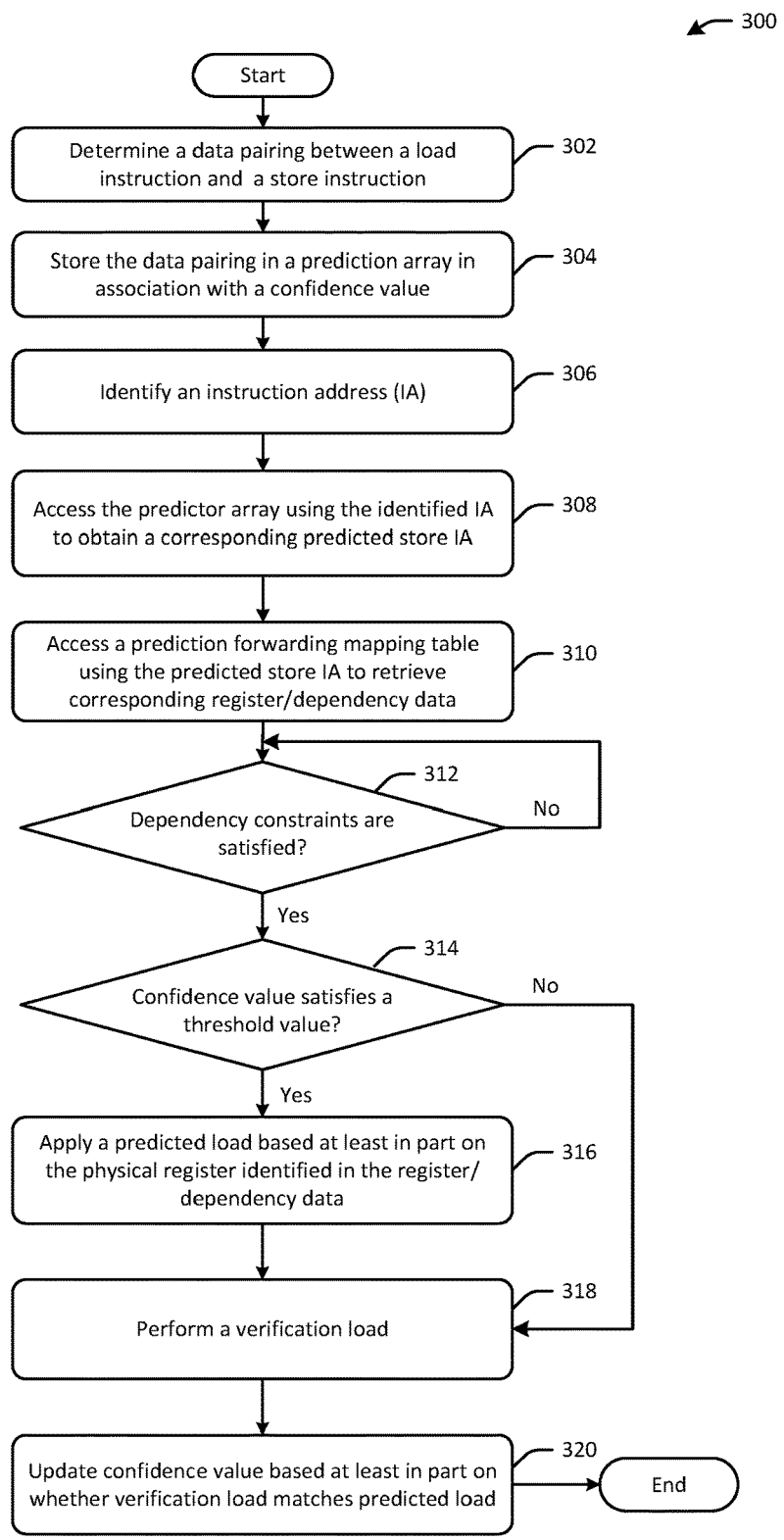
FIG. 3 is a process flow diagram of an illustrative method for determining whether to execute a predicted load to bypass memory access for a load instruction in accordance with one or more example embodiments of the disclosure.

FIG. 1 is a block diagram schematically depicting execution of a predicted load to bypass memory access for a load instruction in accordance with one or more example embodiments of the disclosure. FIG. 2 is a process flow diagram of an illustrative method 200 for executing a predicted load to bypass memory access for a load instruction in accordance with one or more example embodiments of the disclosure. FIG. 3 is a process flow diagram of an illustrative method 300 for determining whether to execute a predicted load to bypass memory access for a load instruction in accordance with one or more example embodiments of the disclosure. FIGS. 2 and 3 will each be described in conjunction with FIG. 1 hereinafter.

Each operation of the method 200 and/or the method 300 may be performed by one or more components (e.g., engines) depicted in FIG. 1. These component(s) may be implemented in any combination of hardware, software, and/or firmware. In certain example embodiments, one or more of these component(s) may be implemented, at least in part, as software and/or firmware that contains or is a collection of one or more program modules that include computer-executable instructions that when executed by a processing circuit cause one or more operations to be performed. A system or device described herein as being configured to implement example embodiments of the disclosure may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring first to FIG. 1, a collection of engines are depicted including a prediction engine 102, a register tracking engine 104, a read/write engine 106, and an instruction execution engine 108. These engines may be implemented in any combination of hardware, software, and/or firmware. In certain example embodiments, these engines may execute across one or more devices having the illustrative configuration depicted in FIG. 4.

Referring now to FIGS. 1 and 2 in conjunction with one another, at block 202, computer-executable instructions of the instruction execution engine 108 may be executed to cause a producer operation to be executed that generates/modifies a value associated with a particular architected register of the set of architected registers 128 that have been defined in the microarchitecture. For ease of explanation, the reference numeral 128 may be used hereinafter to designate the particular architected register referenced above. In certain example embodiments, a set of architected registers may be specified as part of a microarchitecture design. The set of architected registers may be mapped to a set of physical registers in the microarchitecture. In certain example embodiments, a number of physical registers may be greater than or equal to a number of architected registers. As such, the architected register 128 may be mapped to different physical registers for different instructions and/or may be mapped to multiple physical registers simultaneously. More specifically, a value associated with the architected register 128 may be stored in different physical registers for different instructions and/or in multiple physical registers simultaneously.

As a non-limiting example, the producer operation may be summing the values in two registers and storing the resulting sum in one of the registers. For example, if R1 represents the architected register 128, the producer operation may be R1=R1+R2, where R2 is a different architected register. As previously described, the architected register 128 (e.g., R1) may initially be mapped to, for example, physical register 20 (pR20). Similarly, the architected register R2 may be mapped to physical register 22 (pR22). As a result of the producer operation, the values stored in pR20 and pR22 may be summed and the resulting sum may be stored in physical register 21 (pR21). The physical register pR21 may be mapped to the architected register 128 (R1), thereby associating the sum with the architected register 128 (R1).

In certain example embodiments, computer-executable instructions of the register tracking engine 104 may be executed to maintain/modify a mapping between architected registers and physical registers. In an in-order machine, the number of architected registers may equal the number of physical registers. This is because instructions are executed in the order in which they are issued in an in-order machine, and thus, there is no need to maintain more physical registers than architected registers. In an out-of-order machine, however, a more recent/younger instruction may be executed prior to an older instruction, and thus, there is a need to maintain a greater number of physical registers than architected registers.

In those example embodiments in which the number of physical registers exceeds the number of architected registers, a mapping between architected registers and physical registers may be maintained. This mapping between architected registers and physical registers may be reflected in data stored in a register mapping table 138 that is maintained/updated by the register tracking engine 104. The register mapping table 138 may be indexed by architected register and may store, for each indexed architected register, an identification of a physical register that stores a value associated with that architected register. With regards to in-order decode/dispatch for sending the instructions to an out-of-order engine, only the oldest reference to the architected register is required. However, on a flush of the instruction pipeline, where the pipeline has to restore back to a prior state, the architected register alone may not be sufficient. Rather, in such scenarios, knowledge as to which instruction corresponds to the point the flush occurred may also be required. This could be achieved using a micro-op instruction ID.

Referring now more specifically to block 202 of the method 200, the producer operation that is executed may result in a value being generated and stored in a physical register 130 that is mapped to the architected register 128. Alternatively, the producer operation may result in a modification to an existing value stored in the physical register 130. An identification of the physical register 130 storing the value generated/modified by the producer operation may be stored in the register mapping table 138 in association with the corresponding architected register 128. That is, the register mapping table 138 may be written to as a function of the producer operation.

Generally speaking, the register mapping table 138 may associate only a single physical register with an architected register at any given time. However, in order to accommodate the potential need to perform a flush of the instruction pipeline, the register mapping table 138 may store associations between an architected register and multiple physical registers. For example, assume that a set of instructions (e.g., instructions 1-100) has been dispatched. Some subset of these instructions may have been issued. Of the instructions that issued, an older instruction may still be in the process of executing while a newer instruction may have finished executing. For example, the older instruction may be a complex square root calculation or the like while the newer instruction may be a relatively simple load instruction. It should be noted that while a newer instruction may finish execution prior to an older instruction, the newer instruction may not be completed and checkpointed until the older instruction completes execution in order to maintain the appearance that the instructions are executed in order.

In an example scenario, a predicted branch may have been taken at, for example, instruction 15. If it is later determined that the branch was incorrectly predicted (e.g., branch was taken when it should not have been taken or vice versa), all instructions in the pipeline after the branch instruction (e.g., instructions 16-100) are incorrect. This would trigger a flush event according to which all instructions in the pipeline after the branch instruction are flushed and the pipeline is restored beginning with the correct target address of the branch instruction.

In certain example embodiments, the branch instruction described above may occur between two instructions involving the same architected register. For example, an instruction prior to the branch instruction may be assigning the value associated with architected register R7 to architected register R1, and the instruction after the branch instruction may be assigning the value associated with architected register R2 to R1. It should be appreciated that the values associated with these architected registers may be stored in different physical registers. If the branch is incorrectly predicted as described above, then the value associated with architected register R1 needs to be restored to the value associated with architected register R7 (rather than the value associated with architected register R2). In order to properly restore the value of architected register R1, the register mapping table 138 needs to maintain a history of mappings between physical registers and architected registers. In particular, in the example introduced above, the register mapping table 138 may store a mapping between architected register R1 and a physical register corresponding to architected register R7 as well as a mapping between architected register R1 and a physical register corresponding to architected register R2 so that a prior value associated with architected register R1 can be restored if a flush event occurs. In addition, a respective instruction identifier may be stored in association with each mapping to identify which value to restore based on where in the instruction pipeline the flush occurred. It should be appreciated that the above example is merely illustrative and not exhaustive. For example, the register mapping table 138 may store any number of mappings between a given architected register and physical registers.

At block 204, an event may occur that requires register values stored in physical registers to be stored in memory. An example of such an event may be the execution of a function that requires register values stored in the physical registers to be copied to memory. For example, if 16 architected registers are defined in a microarchitecture, but an algorithm requires 17 values, all values cannot be simultaneously associated with the 16 architected registers. Accordingly, at least one register value may be spilled into memory to free up one or more architected registers during execution of the algorithm. In other example embodiments, the number of registers needed by a function may not be known prior to execution of the function or there may be risk that executing the function may corrupt register values, in which case, register values may be spilled to memory.

At block 206, computer-executable instructions of the instruction execution engine 108 may be executed to execute a store instruction to store a value associated with the architected register 128 to a location in memory. The location in memory may be, for example, a location in cache memory such as an L1 cache or an L2 cache. Referring to the same example introduced earlier, execution of the store instruction may cause the value stored in pR21 (the physical register 130 mapped to the architected register 128) to be stored at a memory location.

In certain example embodiments, an entry corresponding to the executed store instruction may be generated in a prediction forwarding mapping table 122 (hereinafter referred to in shorthand as mapping table 122). More specifically, computer-executable instructions of the read/write engine 106 may be executed to perform a write operation 126 to generate the entry in the mapping table 122. In certain example embodiments, the mapping table 122 may be implemented as a regfile with multiple read and write ports. The regfile may be configured to accommodate any suitable number of entries (e.g., 32, 64, etc.). A certain number of bits may be allocated for each entry. For example, the entry corresponding to the store instruction executed at block 206 may include a certain number of bits (e.g., 10 bits) designated for storing a virtual instruction address (IA) tag. The mapping table 122 may be indexed by at least a portion of store IAs.

The virtual IA tag may be a portion of the full IA 124 associated with the store instruction. The number of bits used for storing the virtual IA tag may reflect a tradeoff between aliasing that may result from using a lesser number of bits for the tag and the increased number of entries that may be stored in the mapping table 122 as a result of the lesser number of bits used for the tag. The number of bits used for the tag may also be determined, at least in part, by the amount of storage available for the mapping table 122, power constraints, frequency constraints, and/or cost constraints. The entry corresponding to the store instruction may further include a certain number of bits (e.g., 8 bits) for storing an instruction identifier (e.g., a micro-op ID) of the store instruction; a certain number of bits (e.g., 8 bits) for storing an instruction identifier of a producer operation corresponding to the store instruction; and a certain number of bits (e.g., 8 bits) for storing an identification of the physical register that stored (and may be predicted to currently store) a value generated/modified by the producer operation, where such value is copied to a memory location via execution of the store instruction. It should be appreciated that the particular implementation of the mapping table 122 including the number of bits allocated for each entry and for each data field within each entry are merely illustrative and not exhaustive.

At block 208, the register values may be transferred from memory to the physical registers. As an example, upon the occurrence of a return from a function call, the register values copied to memory at block 204 may be restored to the physical registers. However, in certain example embodiments, a load instruction that loads a value from a memory location into a physical location may be bypassed by performing a predicted load.

In particular, at block 210, computer-executable instructions of the prediction engine 102 may be executed to predict that the store instruction executed at block 206 is correlated to a load instruction to be executed and to utilize the IA of the store instruction to identify a physical register that is storing the value associated with the architected register 128. More specifically, the prediction engine 102 may identify a store IA 118 from the prediction array 114 that is associated with the store instruction that is predicted to correlate to the load instruction (or a correlated load IA in the case of constant load handling which will be described in more detail later in this disclosure). In certain example embodiments, the store instruction might encompass multiple micro-op stores. In such example embodiments, the load prediction obtained from the prediction array 114 not only specifies the store IA 118 but also a uop position of the store instruction. In those example embodiments in which the store instruction is a single micro-op, the default value of 0 may be used. The prediction engine 102 may then utilize the correlated IA (either the store IA 118 or a load IA in the case of constant loads) to access the mapping table 122 and identify a physical register that is storing the value associated with the correlated instruction (e.g., the value associated with architected register 128).

For example, referring again to the example introduced earlier, the identified physical register destination may be pR21, which is mapped to the architected register 128, and in which a value was stored as a result of execution of a producer operation corresponding to the predicted store instruction. This process will be described in more detail later in this disclosure in reference to the illustrative method of FIG. 3. It should be appreciated that although the mapping table 122 is shown as being external to the prediction engine 102, in certain example embodiments, the mapping table 122 may be contained within the prediction engine 102.

At block 212, computer-executable instructions of the instruction execution engine 108 may be executed to perform the predicted load by setting the value in the physical register identified at block 210 into another physical register that is currently mapped to the architected register 128. Referring again to the example introduced earlier, the value stored in pR21 may be copied to physical register 30 (pR30), where pR30 is currently mapped to the architected register 128. In certain example embodiments, various constraints may need to be met before the predicted load is performed. For example, a confidence value associated with the correlation between the predicted store instruction and the load instruction may need to satisfy a threshold value in order to proceed with the predicted load. In addition, various dependency constraints between instructions may need to be satisfied. These constraints will be described in more detail later in this disclosure in reference to the illustrative method 300 of FIG. 3.

In certain example embodiments, a verification load may be performed to verify that the predicted load has resulted in the correct value being stored in the physical register currently mapped to the architected register 128 such that a consumer operation is ensured to operate on the correct value. In particular, at block 214, computer-executable instructions of the instruction execution engine 108 may be executed to initiate the verification load by retrieving the value associated with the architected register 128 from memory. As previously noted, the value may have been stored to a memory location as a result of execution of a store instruction. Referring again to the example introduced earlier, the value in pR21 that was stored to a particular memory location [x] by the store instruction may be retrieved from that memory location [x].

At block 216, the retrieved value may be compared to the value stored in the physical register identified at block 210. If the values differ, this may indicate that the predicted load resulted in the wrong value being stored in the physical register that is currently mapped to the architected register 128. As such, at block 218, the load instruction and all instructions in the instruction pipeline that are younger than the load instruction may be flushed from the pipeline. The pipeline may be flushed in this manner particularly for an out-of-order machine in which younger instructions than the load instruction may have already been executed and may have relied on the incorrect value stored in the physical register associated with the predicted store instruction. After flushing the pipeline, the load instruction may be executed at block 220 by retrieving the value associated with the architected register 128 from memory rather than performing the predicted load. In order to ensure that the predicted load is not performed again, the implementation of the algorithm may prevent the performance of a predicted load immediately after a pipeline flush has occurred.

As will be described in more detail in reference to the illustrative method 300 of FIG. 3, in certain example embodiments, the results of the verification load may be used to update a confidence value associated with the correlation between the predicted store instruction and the load instruction. For example, if the value retrieved from the memory location equals the value stored in the physical register associated with the predicted store instruction (a positive determination at block 216), then the confidence value may be increased. Conversely, if the values differ (a negative determination), the confidence value may be decreased. Further, in certain example embodiments, only the predicted load may be performed and the verification load may not be performed as per other means of confirming data correctness.

More specifically, in lieu of performing a verification load, the mapping table 122 can instead be updated to reflect how values stored in memory may be changing. In particular, a mechanism may be provided to ensure that a predicted load is not performed if content in memory that corresponds to a physical register value is altered by a processor core that stored the value in memory or by another processor core. Such a mechanism may include providing the capability for a processor core to obtain exclusive rights to store to a particular memory location or a range of memory locations.

For example, assume that a multi-threaded program is running on two processor cores—core A and core B. Further assume that core A has exclusive rights to write to memory location x, but that core B requires the capability to write to the same memory location. Additionally assume that a store instruction and a load instruction will execute on core A (referred to hereinafter as store instruction A and load instruction A) and that a store instruction and a load instruction will execute on core B (referred to hereinafter as store instruction B and load instruction B). Core A may execute store instruction A to store a first value to memory location x. Core B may then execute store instruction B, which results in a second different value being stored in memory location x. If a predicted load were then performed in lieu of load instruction A, the first value would be retrieved from a physical register rather than the correct desired value (i.e., the second value stored in memory location x).

As such, if a processor core (e.g., core A) no longer has exclusive rights to write to a particular memory location or a range of memory locations, then the entry in the mapping table 122 that corresponds to the store instruction executed by the processor core (e.g., store instruction A) may be updated to indicate that the entry has been invalidated. More specifically, a bit may be set or flipped to indicate that the value stored in the physical register identified in the entry in the mapping table 122 is no longer valid. Accordingly, referring to the example introduced above, a predicted load would not be performed for load instruction A because when the correlated store instruction IA (e.g., the IA for store instruction A) is used to access an entry in the mapping table 122, the entry would be invalidated.

The illustrative method 200 of FIG. 2 assumes that a predicted load is performed. However, as previously noted, various constraints may need to be evaluated to determine whether the predicted load can be performed. FIG. 3 is a process flow diagram of an illustrative method 300 for determining whether to execute a predicted load to bypass memory access for a load instruction in accordance with one or more example embodiments of the disclosure.

Referring to FIGS. 1 and 3 in conjunction with one another, block 302, a data pairing between a load instruction and a store instruction may be determined using operand addresses 110 associated with the load instruction and the store instruction. Whereas an instruction address is a memory address indicative of a location in memory at which a program instruction is stored, an operand address is a memory address indicative of a location in memory at which data operated on by a program instruction is stored. In certain example embodiments, program instructions and data utilized by the program instructions may be stored in a same cache (e.g., a shared cache) or in different caches (e.g., an instruction cache and a data cache).

More specifically, at block 302, a data pairings table 112 may be accessed. The data pairings table 112 may be indexed by at least a portion of the operand address of data associated with a program instruction (e.g., a store instruction, a load instruction, etc.). When a store instruction is executed, the data pairings table 112 may be written to. In particular, an entry may be generated in the data pairings table 112 that stores at least a portion of an operand address associated with the store instruction in association with an operand address tag (e.g., some other portion of the operand address associated with the store instruction) as well as a store IA for the store instruction.

For example, assuming 64 bit operand addresses, where bit 0 is the most significant bit and bit 63 is the least significant bit, bits 54-63 may be used as the index. In theory, bits 0-53 can then be stored as the operand address tag. However, because the data pairings table 112 is a performance array rather than a functional array, a lesser number of bits (e.g., bits 32-53) can be used for the operand address tag in order to strike a balance between the amount of aliasing that is acceptable and the desired number of entries capable of being accommodated by the data pairings table 112. That is, if a greater number of bits are used for the operand address tag, less aliasing will occur, but the data pairings table 112 will also accommodate a fewer number of entries given a total max area/bit budget for the table. Aliasing may occur if two entries in the data pairings table 112 have the same operand address index as well as the same operand address tag, but correspond to different store instructions, in which case, the wrong store instruction may be paired with a load instruction. Predicted loads that result in the incorrect value being loaded into a physical register due to aliasing may be addressed by performing a verification load or any of the other example mechanisms described earlier.

Still referring to block 302, the data pairings table 112 may be read using a portion of an operand address associated with a load instruction. In particular, the portion of the operand address associated with the load instruction may be used to locate an entry in the data pairings table 112 that has a matching operand address index. An operand address tag associated with the load instruction may then be compared to the operand address tag stored in the matching entry. If the operand address tags match, a potential data pairing 112 between the load instruction and the store instruction may be identified.

In certain example embodiments, the data pairings table 112 may be written to for each store instruction. That is, an entry may be generated in the data pairings table 112 for each store instruction, where the entry is indexed by at least a portion of the operand address where the data is stored in memory by the store instruction, and where the entry includes the IA of the store instruction. In certain example embodiments, however, data may be written to the data pairings table 112 in a power-off learning mode according to which data may not be written for every store instruction.

For example, in a scenario involving repeated code (e.g., a loop) within a region of code that has predicted branches within it, a store instruction within the loop may be encountered repeatedly. As such, it may not be necessary to generate an entry in the data pairings table 112 for the store instruction each time it is encountered because an entry is likely to have already been created, and the store instruction is likely to have already been paired with a load instruction in the prediction array 114, and thus, no additional learning is likely to be achieved by generating additional entries in the data pairings table 112. However, in certain example embodiments, content for learning may nonetheless be captured on a limited basis in scenarios in which a loop is present in a region of code that has predicted branches. For example, an entry may be generated in the data pairings table 112 for 1 out of every 10 store instructions. The above discussion regarding power-off learning applies equally to constant loads as well.

At block 304, the data pairing between the store instruction and the load instruction may be stored as an entry in a prediction array 114. The data pairing may be stored in association with a confidence value that reflects a level of confidence associated with the pairing. More specifically, the confidence value may indicate a level of confidence that execution of the load instruction will result in retrieval of a same value from a memory location that was stored in the memory location as a result of execution of the store instruction that is paired with the load instruction.

In certain example embodiments, an existing branch prediction structure such as branch target buffer (BTB) table may be used to store data that would otherwise be stored in the prediction array 114. The BTB table may be indexed by the IA of a branch instruction, for example, and may store a target IA in association with the branch IA. The target IA is the IA of a target instruction to be executed if the branch is taken. In certain example embodiments, each branch IA and target IA pairing may be stored as an individual entry in the BTB table. In other example embodiments, the BTB table may include multiple-associative entries whereby multiple branches can be tracked within a given block of code (e.g., a 64 byte block of code).

In those example embodiments in which multiple branches can be tracked for a given block of code, a portion of the IA for each branch instruction that may be present in that block of code may be shared across all such branch instructions. For a microarchitecture in which IAs are represented using 64 bits, for example, the shared tag may be some initial portion of the most significant bits (e.g., bits 0 to X). This shared tag may be stored only once in the BTB table for each branch instruction in the block of code, and may be stored in association with a target IA for each branch instruction and a tag to differentiate the branch instructions from one another (e.g., least significant bits ((Y+1) to 63 to denote the offset within the block of code, given an index (X+1) to Y). By virtue of this tag sharing, additional storage is available in the BTB table for storing store IAs and load IAs per a total fixed number of bits. For example, if the BTB table can track up to 3 branch instructions within a given block of code, and there happen to be less than 3 branch instructions within the block of code, then tag sharing among the branch instructions (which defines the number of branches that are to share tag bits) allows additional entries in the BTB table that are not being used to store branch IA/target IA associations to be used for storing load IA/store IA associations. In particular, the load IA may be stored in place of the branch IA and the store IA may be stored in place of the target IA. In this manner, a merged BTB table may be maintained that stores both branch instruction and target instruction pairings as well as load instruction and store instruction pairings, thereby obviating the need to maintain the separate predictor array 114.

At block 306, an IA 116 may be identified. The IA 116 may be provided as input to the prediction engine 102. At block 308, computer-executable instructions of the prediction engine 102 may be executed to access the prediction array 114 using the IA 116 to determine a predicted store IA 118 corresponding to the IA 116. In particular, the prediction array 114 may be indexed using at least portions of instruction addresses. As such, at least a portion of the IA 116 may be used to determine whether the prediction array 114 includes a data pairing between the IA 116 and an IA associated with a store instruction. If such a data pairing exists, the store instruction may be treated as a predicted store instruction corresponding to the instruction having IA 116.

In certain example embodiments, the instruction having IA 116 may be first decoded to determine that it is a load instruction prior to using the IA 116 to access the prediction array 114. Accessing the prediction array 114 only when an instruction has been decoded and determined to be a load instruction may provide power savings. However, doing so would also likely slow down program execution because accesses to the prediction array 114 can only occur if an instruction has been decoded and determined to be a load instruction. In other example embodiments, decoding the instruction first to determine that it is a load instruction may not be required, and instead the prediction array 114 may be accessed for each instruction that is fetched. However, in such example embodiments, a predicted load would only be performed if the instruction whose IA 116 is used to access the prediction array 114 is ultimately determined to be a load instruction when decoded.

In those example embodiments in which the prediction array 114 is accessed prior to decoding the instruction, the prediction array 114 may be accessed at least partially concurrently with instruction fetch (synchronous mode), or alternatively, if the prediction engine 102 is running ahead of the instruction fetch, the prediction array 114 may be accessed at least partially concurrently with accesses of the BTB table (which typically occur prior to instruction fetch). The instruction fetch may lag behind the prediction engine 102 if, for example, there is a cache miss in the L1 cache and the L2 cache must be accessed to fetch the instruction. As another example, the instruction fetch may lag behind the prediction engine 102 if instruction fetch is required to occur in order but the prediction array 114 can be accessed out-of-order.

In certain example embodiments, an instruction identifier (e.g., a micro-op ID) associated with the predicted store instruction may be retrieved from the prediction array 114 in addition to the IA of the predicted store instruction. More specifically, an instruction may be split into multiple micro-op IDs. For example, a store instruction may, in effect, encompass multiple stores, each with its own micro-op ID. The micro-op ID can be used to differentiate store instructions from one another within a multi-store instruction, and can further be used to identify the particular store instruction within the multi-store instruction that correlates to a load instruction.

At block 310, computer-executable instructions of the read/write engine 106 may be executed to access the mapping table 122 using the predicted store IA and/or the instruction identifier associated the predicted store instruction 118 and to perform a read operation 120 to retrieve a corresponding matching entry in the mapping table 122. The matching entry stored in the mapping table 122 that corresponds to the predicted store instruction may include any of the example types of data previously described. In particular, the matching entry in the mapping table 122 may include a virtual IA tag associated with the predicted store instruction (e.g., at least a portion of the predicted store instruction IA 118); an instruction identifier (e.g., a micro-op ID) of the predicted store instruction; an instruction identifier of a producer operation corresponding to the predicted store instruction; and an identification of the physical register that stored (and that is predicted to currently store) a value generated/modified by the producer operation, where such value is copied to a memory location via execution of the predicted store instruction. It should be appreciated that actual values stored in physical registers are not stored in the prediction array 114, but rather may be stored in a register file.

At block 312, computer-executable instructions of the prediction engine 102 may be executed to determine whether one or more dependency constraints are met. An example dependency constraint may be that the predicted load occurs after the producer operation is performed. This can be determined by identifying an instruction identifier associated with the producer operation in the register/dependency data 134 and comparing the instruction identifier of the producer operation with an instruction identifier associated with the predicted load to ensure that the producer operation has already been performed. Another example dependency constraint may be that the predicted store instruction be executed prior to a verification load. This can similarly be determined by comparing an instruction identifier of the predicted store instruction with an instruction identifier of the verification load.

In response to a negative determination at block 312, the method 300 may again proceed from block 312, where again a determination is made as to whether one or more dependency constraints are met. The determination at block 312 may be repeatedly executed until a positive determination that all dependency constraint(s) are met is made. In response to a positive determination at block 312, the method 300 may proceed to block 314, where computer-executable instructions of the prediction engine 102 may be executed to determine whether the confidence value satisfies a threshold value. Depending on the implementation, a first value may satisfy a second value if the first value is greater than or equal to the second value or if the first value is less than or equal to the second value. The decision at block 312 may be made to ensure that predicted loads are only performed if the confidence value associated with the load instruction and predicted store instruction pairing 112 meets a threshold value, thereby indicating suitable confidence that a value stored in a physical register as a result of a producer operation associated with the predicted store instruction is a same value as would be retrieved from memory if the load instruction is executed. This, in turn, indicates suitable confidence that a consumer would operate on the correct value if a predicted load is performed and execution of the actual load instruction is bypassed.

In response to a positive determination at block 314, computer-executable instructions of the instruction execution engine 108 may be executed at block 316 to apply a predicted load based at least in part on the physical register identified in the matching entry in the mapping table 122. In particular, another physical register 130 that is currently mapped to the architected register 128 may be identified from the register mapping table 138, and the predicted load may be performed to copy a value stored in the physical register identified in the matching entry in the mapping table 122 to the physical register 130 that is currently mapped to the architected register 128. In addition, any dependencies between registers may be identified from the register/dependency data 134. For example, the value to which the physical register identified in the matching entry in the mapping table 122 is set may be dependent on the values to which other physical registers are set.

In certain example embodiments, the method 300 may proceed to block 318 from block 316. In addition, in response to a negative determination at block 314, the method 300 may skip block 316 and proceed directly to block 318. At block 318, computer-executable instructions of the instruction execution engine 108 may be executed to perform a verification load. As previously noted, a verification load may include retrieving a value stored at a memory location specified by the load instruction and comparing the retrieved value to the physical register value used to perform the predicted load.

At block 320, the confidence value associated the load instruction and predicted store instruction pairing 112 may be updated based at least in part on whether the verification load matches the predicted load, or more specifically, whether the value retrieved from memory by the verification load equals the physical register value used to perform the predicted load. If the values do not match, the confidence value may be decreased, making it less likely that future predicted loads are performed for load instructions correlated with the predicted store instruction in the prediction array 114. Conversely, if the values do match, the confidence value may be increased, making it more likely that future predicted loads are performed for load instructions correlated with the predicted store instruction. It should be appreciated that if a negative determination is made at block 314, the predicted load is not performed at block 316. However, the confidence value may still be updated at block 320. In particular, although a predicted load may not be performed in the case of a negative determination at block 314, a prediction can still be made. Then, upon performance of the verification load at block 318, the confidence value can be updated at block 320 based on whether the prediction was correct. If the prediction is correct, the confidence value may be increased. If the confidence value becomes strong enough, a predicted load may ultimately be performed in the future based on the prediction.

Performing a predicted load in accordance with example embodiments of the disclosure improves instruction execution performance because it involves a register-to-register copying operation to be performed in lieu of a memory access. Register operations involve fewer execution cycles than memory accesses. As such, a consumer operation is able to operate on a value stored in a physical register as a result of the predicted load without having to wait for the actual load instruction to perform a memory access and store the retrieved value in a physical register. Performing a predicted load in accordance with example embodiments of the disclosure also allows for out-of-order instruction execution. In particular, a more recent instruction in an instruction queue that relies on the value associated with an older load instruction in the queue can be executed while the verification of the older load instruction is still waiting to complete if, for example, a predicted load is performed to obtain the value from a physical register that the more recent instruction needs to execute.

In certain example embodiments, a pattern table may be maintained and accessed to handle situations in which a predicted load may result in an incorrect value because there is ambiguity as to which store instruction may correlate to a load instruction. For example, assume that the following pseudo-code represents conditional code that is executed: if x=1, then execute a store instruction at IA Y to store value 1 at memory location [x], else execute a store instruction at IA Z to store value 2 at memory location [x]. Thus, different values may be stored at memory location [x] depending on the outcome of the conditional (i.e., whether x=1 or not, and thus, which store instruction is executed). Further assume that this conditional code is followed by a load instruction to load the contents at memory location [x] into a physical register. In this example, a predicted load may not be able to be performed because the predictor array 114 maps a load IA to a single store IA, and in this scenario, there is ambiguity as to which store IA should be correlated to the load IA. This ambiguity is only resolved during program execution when the outcome of the conditional becomes known.

A pattern table that can be accessed in parallel to the prediction array 114 can be used to handle such example scenarios. The pattern table may store similar content to the prediction array 114 (e.g., store IAs), but may be indexed differently than the prediction array 114. In particular, while the prediction array 114 may be indexed using an IA (e.g., a load IA), the pattern table may be indexed by a hash of an IA with a pattern that represents historical conditional outcomes. For example, the pattern may indicate the outcomes of the last X number of branch instructions. The pattern may be represented using a Global History Vector (GHV), where each bit value in the GHV indicates whether a historical branch instruction was taken or not taken.

Thus, in certain example embodiments, while an IA (e.g., a load IA) may be used to index against the prediction array 114 to attempt to identify the IA of a correlated instruction (e.g., a store IA, the IA of a correlated load instruction, etc.), the IA may also be hashed with a pattern (e.g., the GHV) to obtain a hash value that is used to index against the pattern table. If a match for the hash value is located in the pattern table, then the corresponding IA stored in that matching entry in the pattern table (e.g., a store IA, the IA of a correlated load instruction, etc.) may be used in lieu of the result (if any) obtained from accessing the prediction array 114.

Example embodiments of the disclosure have been primarily described in connection with identifying store instructions that are correlated to load instructions. However, in certain example embodiments, correlating a store instruction to a load instruction may be difficult. More specifically, in certain example embodiments, a load instruction may be executed repeatedly to load a value from the same location in memory (referred to herein as constant loads). For example, the code being executed may include a loop that requires a constant load instruction to be executed repeatedly to load the same data from the same memory location multiple times. In such an example scenario, the store instruction that stored that data at that memory location may have been executed much earlier in time such that correlating the store instruction to the constant load is difficult.

In such example embodiments, the data pairings table 112 can be leveraged to enable predicted loads to be performed in connection with constant loads. More specifically, the data pairings table 112 has been previously described as storing the IAs of store instructions; however, load IAs may also be stored in the data pairings table 112 to enable predicted loads to be performed in connection with constant loads. In particular, if no match is located in the data pairings table 112 when at least a portion of the operand address associated with a load instruction is indexed against the table 112, a new entry may be generated in the data pairings table 112 that includes as its index at least a portion of the operand address associated with the load instruction and that stores the IA of the constant load. Then, when the constant load is again executed, a match in the data pairings table 112 may be located, and a load instruction-load instruction pairing may be stored in the prediction array 114. An entry in the prediction array 114 may be designated as a load instruction-load instruction pairing or as a store instruction-load instruction pairing, whichever the case may be.

In certain example embodiments, a load instruction may be dependent on a store instruction that occurred much earlier in time, such that the physical register—whose value was stored to memory by the store instruction—may no longer store the value required by the load instruction. In such example embodiments, even if a predicted store IA is obtained from the prediction array 114 based on the IA of the load instruction, either no entry corresponding to that predicted store IA would be present in the mapping table 122 or the corresponding entry would be invalidated. In either case, a predicted load would not be able to be performed using the physical register associated with the predicted store instruction.

An IA store data array 136 may be provided to accommodate scenarios such as that described above in which a physical register may have been repurposed or retired between when a store instruction is executed and when a load instruction is to be executed, thereby causing an entry in the mapping table 122 corresponding to the store instruction to become invalidated. The IA store data array 136 may store data associated with store instructions as a function of the IAs associated with the store instructions.

More specifically, the IA store data array 136 may be indexed by store IA, and rather than storing, for example, an identification of a physical register presumed to hold a value associated with a store instruction (as the mapping table 122 does), the IA store data array 136 may store the corresponding value itself. As such, when a store instruction is executed, in addition to a value being written to cache, the value may also be stored in the IA store data array 136 and indexed by the IA of the store instruction. In this manner, the IA store data array 136 may serve as a backup to the mapping table 122. That is, if a mapping table 122 entry corresponding to a store IA has been invalidated (indicating that the physical register identified in the entry no longer stores the correct value), the IA store data array 136 may be accessed using the store IA to attempt to locate an entry in the IA store data array 136. If a matching entry is located in the IA store data array 136, the data may be retrieved from the matching entry and used to perform a predicted load.

The IA store data array 136 may have a larger storage capacity than the mapping table 122 (i.e., capable of accommodating more entries), but data may be written to the IA store data array 136 later than to the mapping table 122. This is so because a store instruction needs to be executed for the data to be written to the IA store data array 136, whereas the data stored in a physical register identified in an entry in the mapping table 122 may be available after the producer operation is performed without requiring the store instruction to be executed.

In addition, in certain example scenarios, a mapping table 122 entry may be invalidated but the data previously stored in the physical register may not have been written to the IA store data array 136 yet. For example, a processor design may allow for multiple store instructions to be executed in parallel and the corresponding data to be written to a queue to ultimately be stored in memory. However, writing to the IA store data array 136 may be bandwidth limited such that there is delay between execution of store instructions and the writing of data to the IA store data array 136. As such, in the above-described scenario, there may be a delay between when a mapping table 122 entry is invalidated and when an entry is generated in the IA store data array 136. In another example scenario, a mapping table 122 entry may be invalidated and the data may also not be available in the IA store data array 136 because the entry in the IA store data array 136 may have been overwritten with data corresponding to a different store instruction having the same index as the store instruction of interest (due to aliasing).

In those example scenarios in which a mapping table 122 entry is invalidated and the physical register data is not stored in the IA store data array 136, whether a predicted load is performed may depend on the timing of when a load is determined to be a predicted load. For instance, if a load instruction is determined to be a predicted load prior to accessing the mapping table 122 and the IA store data array 136, and the mapping table 122 entry has been invalidated and no entry is present in the IA store data array 136, then the predicted load may still be performed, but would result in incorrect data being loaded into a register, and thus, would require a pipeline flush as described earlier. Conversely, if the mapping table 122 and the IA store data array 136 are accessed prior to determining that a load instruction will be a predicted load, then if the mapping table 122 entry has been invalidated and no entry is present in the IA store data array 136, the predicted load may not be performed. In certain example embodiments, the former scenario is more likely if the prediction array 114 is accessed at least partially in parallel with the instruction fetch, while the latter scenario is more likely if the prediction array 114 is accessed at least partially in parallel or as a function of instruction decoding.

In certain example embodiments, in order to shorten the delay between when a physical register has been repurposed (e.g., a mapping table 122 entry has been invalidated) and when the register value is written to the IA store data array 136, the register value may be copied to the IA store data array 136 upon the regfile being invalidated. In addition, the IA store data array 136 may be read earlier in the instruction pipeline should additional time be required to access the IA store data array 136.

In certain example embodiments, the IA store data array 136 may be written to in connection with constant loads. As previously described, if no operand address match is found for a load instruction in the data pairings table 112 (e.g., no potential store instruction to pair with the load instruction), the IA of the load instruction may be written into the data pairings table 112. Then, when the constant load instruction occurs again, a match is detected in the data pairings table 112, and a load instruction-load instruction pairing is written to the prediction array 114, thereby qualifying the load instruction for prediction. At the point when the load instruction qualifies for prediction, the data associated with the load instruction may be written to the IA store data array 136 and may be indexed by the IA of the load instruction. As such, when the constant load instruction occurs again, the matching load IA may be obtained from the prediction array 114 and used to access the corresponding data in the IA store data array 136 without having to access the mapping table 122.

Throughout this disclosure the terms array and table have been used. An array may be, for example, a data structure that is typically limited to 1 or 2 read ports such that typically at most two reads or one read and one write can be performed. A table may encompass a broader group of data structures than an array. For example, a table may be a regfile with a greater number of ports than an array that can be defined in any combination of reads and writes. An array may be more dense than a regfile. While certain data structures have been described as either an array or a table, it should be appreciated that the disclosure is not limited to these types of data structures, and that any data structure described as an array or a table may instead be implemented using any suitable type of data structure.

In addition, in certain example embodiments of the disclosure, the term "load instruction" or variants thereof may refer to a single load instruction. In other example embodiments of the disclosure, the term load instruction may refer to a load that is one among multiple different micro-ops within a complex instruction that may be used in a Complex Instruction Set Computing (CISC) architecture. For example, an architecture may define an add instruction where one of the values being added comes from memory. In such a scenario, the load instruction may be a micro-op within the add instruction.

Example embodiments of the disclosure provide various technical features, technical effects, and/or improvements to technology. For instance, example embodiments of the disclosure provide the technical effect of improving instruction execution performance. Example embodiments of the disclosure also provide the technical effect of improving out-of-order instruction execution. These technical effects are achieved at least in part by the technical features of determining an instruction that is predicted to correlate to a load instruction, obtaining data associated with a producer operation that corresponds to the predicted correlated instruction, and performing a predicted load that allows a consumer to utilize a value stored in a physical register identified in the obtained data while avoiding a memory access associated with execution of the load instruction. The predicted correlated instruction may be a store instruction or a load instruction (in the case of constant loads). The technical features further include a prediction array that is indexed only using IAs of load instructions, the capability to predict constant loads, merging of the BTB table and the prediction array, the capability to perform verification loads, providing a pattern table and an IA store data array to increase the number of opportunities for performing a predicted load, and so forth. These technical features provide the technical effect of improved instruction execution performance at least in part because copying data from one physical register to another physical register requires less execution cycles than accessing a memory location and copying data stored at the memory location to a physical register. These technical features provide the technical effect of improving conventional out-of-order instruction execution at least in part because they provide a variety of non-routine and non-conventional mechanisms for performing a predicted load. Accordingly, the above-described technical features and resulting technical effect constitute an improvement to the functioning of a computer. It should be appreciated that the above examples of technical features, technical effects, and improvements to the functioning of a computer and computer technology provided by example embodiments of the disclosure are merely illustrative and not exhaustive.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
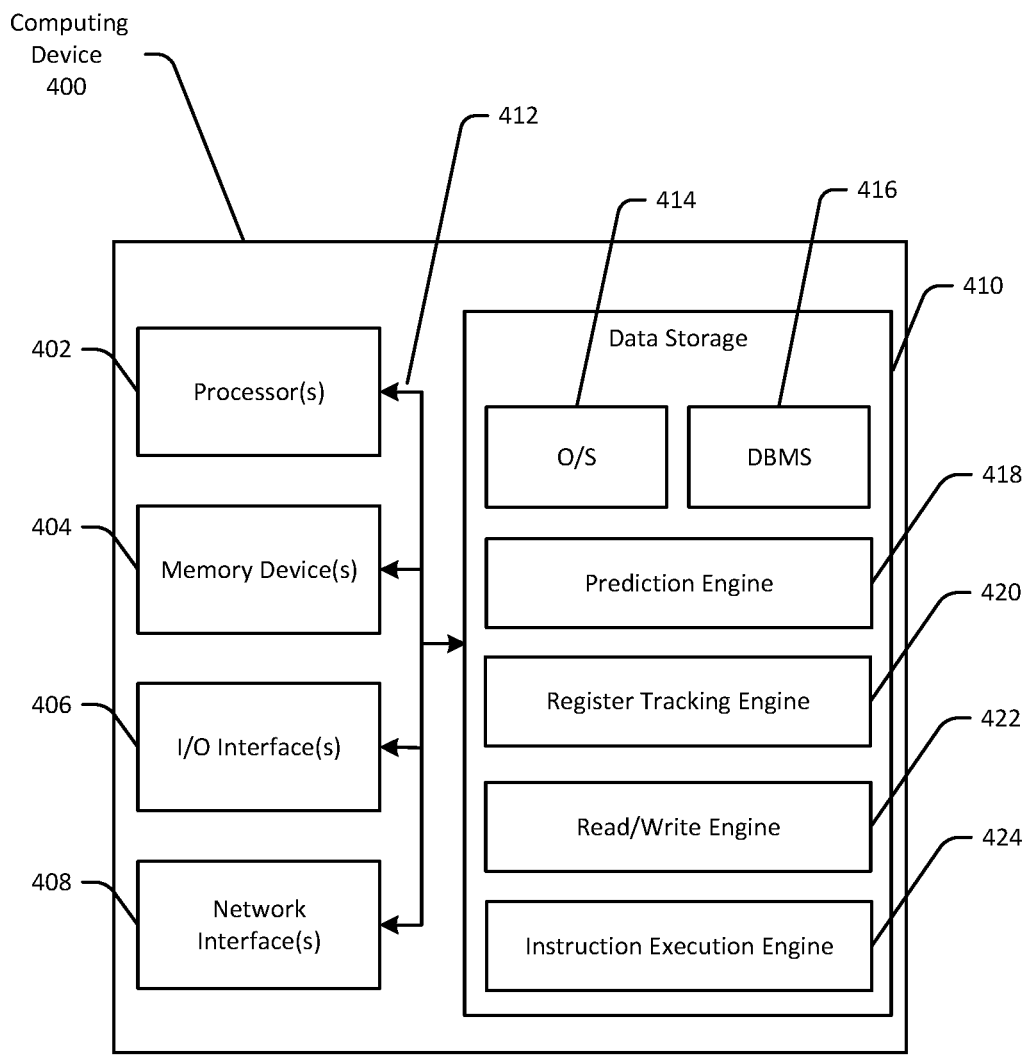
FIG. 4 is a schematic diagram of an illustrative computing device configured to implement one or more example embodiments of the disclosure.

FIG. 4 is a schematic diagram of an illustrative computing device 400 configured to implement one or more example embodiments of the disclosure. The device architecture stack 100 depicted in FIG. 1 may correspond to an illustrative configuration of the computing device 400. While the device 400 may be described herein in the singular, it should be appreciated that multiple instances of the device 400 may be provided, and functionality described in connection with the device 400 may be distributed across such multiple instances.

In an illustrative configuration, the device 400 may include one or more processors (processor(s)) 402, one or more memory devices 404 (generically referred to herein as memory 404), one or more input/output ("I/O") interface(s) 406, one or more network interfaces 408, and data storage 410. The device 400 may further include one or more buses 412 that functionally couple various components of the device 400.

The bus(es) 412 may include at least one of a system bus, a memory bus, an address bus, or a message bus, and may permit the exchange of information (e.g., data (including computer-executable code), signaling, etc.) between various components of the device 400. The bus(es) 412 may include, without limitation, a memory bus or a memory controller, a peripheral bus, an accelerated graphics port, and so forth. The bus(es) 412 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 404 may represent the physical memory 102 depicted in FIG. 1 and may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 404 may include multiple different types of memory such as various types of static random access memory (SRAM), various types of dynamic random access memory (DRAM), various types of unalterable ROM, and/or writeable variants of ROM such as electrically erasable programmable read-only memory (EE- PROM), flash memory, and so forth. The memory 404 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 410 may include removable storage and/or non-removable storage including, but not limited to, magnetic storage, optical disk storage, and/or tape storage. The data storage 410 may provide non-volatile storage of computer-executable instructions and other data. The memory 404 and the data storage 410, removable and/or non-removable, are examples of computer-readable storage media (CRSM) as that term is used herein.

The data storage 410 may store computer-executable code, instructions, or the like that may be loadable into the memory 404 and executable by the processor(s) 402 to cause the processor(s) 402 to perform or initiate various operations. The data storage 410 may additionally store data that may be copied to memory 404 for use by the processor(s) 402 during the execution of the computer-executable instructions. Moreover, output data generated as a result of execution of the computer-executable instructions by the processor(s) 402 may be stored initially in memory 404 and may ultimately be copied to data storage 410 for non-volatile storage.

More specifically, the data storage 410 may store one or more operating systems (O/S) 414 (which may include the O/S 414 and which may include one or more virtual O/S instances); one or more database management systems (DBMS) 416 configured to access the memory 404 and/or one or more external data store(s) (not shown); and one or more program modules, applications, engines, computer-executable code, scripts, or the like such as, for example, a prediction engine 418, a register tracking engine 420, a read/write engine 422, and an instruction execution engine 424. Any of the components depicted as being stored in data storage 410 may include any combination of software, firmware, and/or hardware. The software and/or firmware may include computer-executable instructions (e.g., computer-executable program code) that may be loaded into the memory 404 for execution by one or more of the processor(s) 402 to perform any of the operations described earlier in connection with correspondingly named engines.

Although not depicted in FIG. 4, the data storage 410 may further store various types of data utilized by components of the device 400 (e.g., data pairings 112, the prediction array 114, the mapping table 122, the IA store data array 136, etc.). Any data stored in the data storage 410 may be loaded into the memory 404 for use by the processor(s) 402 in executing computer-executable instructions. In addition, any data stored in the data storage 410 may potentially be stored in external data store(s) and may be accessed via the DBMS 416 and loaded in the memory 404 for use by the processor(s) 402 in executing computer-executable instructions.

The processor(s) 402 may be configured to access the memory 404 and execute computer-executable instructions loaded therein. For example, the processor(s) 402 may be configured to execute computer-executable instructions of the various program modules, applications, engines, or the like of the device 400 to cause or facilitate various operations to be performed in accordance with one or more embodiments of the disclosure. The processor(s) 402 may include any suitable processing unit capable of accepting data as input, processing the input data in accordance with stored computer-executable instructions, and generating output data. The processor(s) 402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 402 may be capable of supporting any of a variety of instruction sets.

Referring now to other illustrative components depicted as being stored in the data storage 410, the O/S 414 may be loaded from the data storage 410 into the memory 404 and may provide an interface between other application software executing on the device 400 and hardware resources of the device 400. More specifically, the O/S 414 may include a set of computer-executable instructions for managing hardware resources of the device 400 and for providing common services to other application programs. In certain example embodiments, the O/S 414 may include or otherwise control execution of one or more of the program modules depicted as being stored in the data storage 410. The O/S 414 may include any operating system now known or which may be developed in the future including, but not limited to, any server operating system, any mainframe operating system, or any other proprietary or non-proprietary operating system.

The DBMS 416 may be loaded into the memory 404 and may support functionality for accessing, retrieving, storing, and/or manipulating data stored in the memory 404, data stored in the data storage 410, and/or data stored in external data store(s). The DBMS 416 may use any of a variety of database models (e.g., relational model, object model, etc.) and may support any of a variety of query languages. The DBMS 416 may access data represented in one or more data schemas and stored in any suitable data repository. External data store(s) that may be accessible by the device 400 via the DBMS 416 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the device 400, the input/output (I/O) interface(s) 406 may facilitate the receipt of input information by the device 400 from one or more I/O devices as well as the output of information from the device 400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 400 or may be separate. The I/O devices may further include, for example, any number of peripheral devices such as data storage devices, printing devices, and so forth.

The I/O interface(s) 406 may also include an interface for an external peripheral device connection such as universal serial bus (USB), FireWire, Thunderbolt, Ethernet port or other connection protocol that may connect to one or more networks. The I/O interface(s) 406 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 400 may further include one or more network interfaces 408 via which the device 400 may communicate with any of a variety of other systems, platforms, networks, devices, and so forth. The network interface(s) 408 may enable communication, for example, with one or more other devices via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules depicted in FIG. 4 as being stored in the data storage 410 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the device 400 and/or hosted on other computing device(s) accessible via one or more networks, may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of devices 400 in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the device 400 may include alternate and/or additional hardware, software, or firmware components beyond those described or depicted without departing from the scope of the disclosure. More particularly, it should be appreciated that software, firmware, or hardware components depicted as forming part of the device 400 are merely illustrative and that some components may not be present or additional components may be provided in various embodiments. While various illustrative modules have been depicted and described as software modules stored in data storage 410, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 200 or the method 300 may be performed by a device 400 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative method of FIG. 2 or the illustrative method of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 2 or FIG. 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for bypassing memory access for a load instruction, the method comprising:
    determining a predicted instruction address (IA) corresponding to a load IA associated with the load instruction at least in part by accessing a first data structure that is indexed by IAs associated with load instructions;
    utilizing at least a portion of the predicted IA to access a second data structure to determine a first physical register storing a value associated with the load instruction; and executing a predicted load as part of the load instruction at least in part by setting a second physical register to the value associated with the load instruction.

2. The computer-implemented method of claim 1, wherein the predicted IA is a predicted store IA associated with a store instruction, and wherein accessing the second data structure comprises:
accessing an entry in the second data structure that is indexed by at least a portion of the predicted store IA;
determining, from the entry in the second data structure, the first physical register associated with the predicted store IA; and
obtaining the value associated with the load instruction from the first physical register.

3. The computer-implemented method of claim 1, further comprising:
determining a confidence value associated with the predicted IA; and
determining that the confidence value satisfies a threshold value.

4. The computer-implemented method of claim 1, wherein determining the predicted IA corresponding to the load IA associated with the load instruction comprises:
accessing an entry in the first data structure utilizing at least a portion of the load IA; and
identifying the predicted IA from the entry in the first data structure.

5. The computer-implemented method of claim 4, further comprising:
identifying a data pairing between the predicted IA and the load IA based at least in part on a match between a first operand address associated with the predicted IA and a second operand address associated with the load IA; and
generating the entry in the first data structure based at least in part on the data pairing.

6. The computer-implemented method of claim 4, wherein the first data structure is a branch prediction data structure.

7. The computer-implemented method of claim 1, wherein the load instruction is a first load instruction, the load IA is a first load IA, the predicted IA is a first predicted IA, and the predicted load is a first predicted load, the method further comprising:
determining a second predicted IA corresponding to a second load IA associated with a second load instruction at least in part by accessing the first data structure;
determining that an entry in the second data structure corresponding to the second predicted IA has been invalidated;
utilizing at least a portion of the second predicted IA to access a third data structure and locate an entry in the third data structure corresponding to the second predicted IA, wherein the entry in the third data structure contains a value associated with the second load instruction; and
executing a second predicted load as part of the second load instruction at least in part by setting a third physical register to the value associated with the second load instruction.

8. The computer-implemented method of claim 1, wherein the load instruction is a first load instruction, the load IA is a first load IA, and the predicted IA is a first predicted IA, the method further comprising:
determining a second predicted IA corresponding to a second load IA associated with the second load instruction, the determining comprising:
hashing the second load IA with a pattern to obtain a hash value;
utilizing the hash value to index against a pattern table to identify a matching entry in the pattern table; and
determining the second predicted IA from the matching entry in the pattern table.

9. The computer-implemented method of claim 1, wherein the third data structure is indexed by a second set of store IAs.

10. A system for bypassing memory access for a load instruction, the system comprising:
at least one memory storing computer-executable instructions; and
at least one processor operatively coupled to the at least one memory and configured to access the at least one memory to execute the computer-executable instructions to:
determine a predicted instruction address (IA) corresponding to a load IA associated with the load instruction at least in part by accessing a first data structure that is indexed by IAs associated with load instructions;
utilize at least a portion of the predicted IA to access a second data structure to determine a first physical register storing a value associated with the load instruction; and
execute a predicted load as part of the load instruction at least in part by setting a second physical register to the value associated with the load instruction.

11. The system of claim 10, wherein the predicted IA is a predicted store IA associated with a store instruction, and wherein the at least one processor is configured to access the second data structure by executing the computer-executable instructions to:
access an entry in the second data structure that is indexed by at least a portion of the predicted store IA;
determine, from the entry in the second data structure, the first physical register associated with the predicted store IA; and
obtain the value associated with the load instruction from the first physical register.

12. The system of claim 10, wherein the at least one processor is further configured to execute the computer-executable instructions to:
determine a confidence value associated with the predicted IA; and
determine that the confidence value satisfies a threshold value.

13. The system of claim 10, wherein the at least one processor is configured to determine the predicted IA corresponding to the load IA associated with the load instruction by executing the computer-executable instructions to:
access an entry in the first data structure utilizing at least a portion of the load IA; and
identify the predicted IA from the entry in the first data structure.

14. The system of claim 13, wherein the at least one processor is further configured to execute the computer-executable instructions to:
identify a data pairing between the predicted IA and the load IA based at least in part on a match between a first operand address associated with the predicted IA and a second operand address associated with the load IA; and
generate the entry in the first data structure based at least in part on the data pairing.

15. The system of claim 13, wherein the first data structure is a branch prediction data structure.

16. The system of claim 10, wherein the load instruction is a first load instruction, the load IA is a first load IA, the predicted IA is a first predicted IA, and the predicted load is a first predicted load, and wherein the at least one processor is further configured to execute the computer-executable instructions to:
  determine a second predicted IA corresponding to a second load IA associated with a second load instruction at least in part by accessing the first data structure;
  determine that an entry in the second data structure corresponding to the second predicted IA has been invalidated;
  utilize at least a portion of the second predicted IA to access a third data structure and locate an entry in the third data structure corresponding to the second predicted IA, wherein the entry in the third data structure contains a value associated with the second load instruction; and
  execute a second predicted load as part of the second load instruction at least in part by setting a third physical register to the value associated with the second load instruction.

17. The system of claim 10, wherein the load instruction is a first load instruction, the load IA is a first load IA, and the predicted IA is a first predicted IA, and wherein the at least one processor is further configured to execute the computer-executable instructions to:
  determine a second predicted IA corresponding to a second load IA associated with the second load instruction, the determining comprising:
    hashing the second load IA with a pattern to obtain a hash value;
    utilizing the hash value to index against a pattern table to identify a matching entry in the pattern table; and
    determining the second predicted IA from the matching entry in the pattern table.

18. The system of claim 10, wherein the third data structure is indexed by a second set of store IAs.

19. A computer program product for bypassing memory access for a load instruction, the computer program product comprising a non-transitory storage medium readable by a processing circuit, the storage medium storing instructions executable by the processing circuit to cause a method to be performed, the method comprising:
  determining a predicted instruction address (IA) corresponding to a load IA associated with the load instruction at least in part by accessing a first data structure that is indexed by IAs associated with load instructions;
  utilizing at least a portion of the predicted IA to access a second data structure to determine a first physical register storing a value associated with the load instruction; and
  executing a predicted load as part of the load instruction at least in part by setting a second physical register to the value associated with the load instruction.

20. The computer program product of claim 19, wherein the predicted IA is a predicted store IA associated with a store instruction, and wherein accessing the second data structure comprises:
  accessing an entry in the second data structure that is indexed by at least a portion of the predicted store IA;
  determining, from the entry in the second data structure, the first physical register associated with the predicted store IA; and
  obtaining the value associated with the load instruction from the first physical register.

* * * * *